United States Patent [19]

Cenegy et al.

[11] Patent Number: 5,044,439

[45] Date of Patent: Sep. 3, 1991

[54] METHOD OF TREATING GEOTHERMAL WELLS WITH ACRYLATE/ACRYLAMIDE SCALE INHIBITOR

[75] Inventors: Lawrence M. Cenegy, Spring; Darrel F. Griffith, Houston, both of Tex.; George W. M. Hobbs, Adelaide, Australia

[73] Assignee: Exxon Chemical Patents, Inc., Linden, N.J.

[21] Appl. No.: 521,584

[22] Filed: May 10, 1990

[51] Int. Cl.$^5$ .......................... E21B 43/12; C02F 5/12
[52] U.S. Cl. .................................... 166/310; 60/641.2; 166/371; 210/701; 252/855.2
[58] Field of Search ...................... 166/310, 371, 902; 252/855.2; 60/641.2; 210/701

[56] References Cited

U.S. PATENT DOCUMENTS

| | | | |
|---|---|---|---|
| 3,463,730 | 8/1969 | Booth et al. | 252/180 X |
| 3,663,448 | 5/1972 | Ralston | 252/8.552 X |
| 3,704,750 | 12/1972 | Miles et al. | 252/8.552 X |
| 4,008,164 | 2/1977 | Watson et al. | 252/8.552 X |
| 4,032,460 | 6/1977 | Zilch et al. | 166/310 X |
| 4,476,930 | 10/1984 | Watanabe | 166/310 X |
| 4,566,973 | 1/1986 | Masler, III et al. | 252/8.552 X |

*Primary Examiner*—George A. Suchfield
*Attorney, Agent, or Firm*—Robert L. Graham

[57] ABSTRACT

A geothermal water well is treated with an effective amount of a scale inhibitor formulation containing a Na acrylate/acrylamide copolymer to inhibit the buildings of $CaCO_3$ scale therein.

9 Claims, No Drawings

METHOD OF TREATING GEOTHERMAL WELLS WITH ACRYLATE/ACRYLAMIDE SCALE INHIBITOR

FIELD OF THE INVENTION

This invention relates to a method of treating geothermal wells to prevent scale deposits. In one aspect, the invention relates to a method of treating hot geothermal wells using a scale inhibitor formulation which contains Na acrylate/acrylamide copolymer.

BACKGROUND OF THE INVENTION

In geothermal operations, hot water or steam is flowed from a subterranean location and its energy converted to useful form such as power for electric generators, etc.

A problem associated with geothermal wells is their tendency to scale up in the flash zone. Release of pressure reduces the solubility equilibrium of salts (e.g. $CaCO_3$) in the water as the water converts to steam. This results in scale deposition at or near the flash zone. If not inhibited the deposits will reduce the flow area and plug the well pipe used to conduct the geothermal fluid to the surface.

Conventional scale inhibitors such as phosphonates and polyacrylates are not thermally stable at high temperatures and for that reason are not effective in the treatment of high temperature (above 400° F.) geothermal wells.

SUMMARY OF THE INVENTION

The method of the present invention employs an effective amount of a scale inhibitor formulation comprising an aqueous solution of a Na acrylate/acrylamide copolymer as a $CaCO_3$ scale inhibitor in hot geothermal wells (400°–700° F.). The aqueous solution is preferably adjusted to a substantially neutral pH.

The scale inhibitor formulation is injected into the geothermal well pipe at a location below the flash zone to provide an inhibitor concentration in the water of preferably 0.5 to 10 ppm (by weight).

DESCRIPTION OF THE PREFERRED EMBODIMENTS

As mentioned previously, the method of the present invention employs a scale inhibitor formulation comprising an aqueous solution of a modified polyacrylate.

The active copolymer in the scale inhibitor formulation is a Na acrylate/acrylamide copolymer having the following formula:

$$\left( \begin{array}{c} R_1 \\ | \\ C-C \\ | \\ C=O \\ | \\ NH_2 \end{array} \right)_x \left( \begin{array}{c} R_2 \\ | \\ C-C \\ | \\ C=O \\ | \\ ONa \end{array} \right)_y$$

where
$x+y=1$;
x ranges from about 0.3 to about 0.15;
y ranges from about 0.7 to about 0.85;
$R_1$ is H, $C_1$ or $C_2$; and
$R_2$ is H, $C_1$ or $C_2$.

The sodium acrylate/acrylamide copolymer is preferably derived from hydrolyzed polyacrylonitrile, wherein the degree of hydrolyzation determines the weight ratios of the polyacrylic acid (and its Na salt) and polyacrylamide. The weight ratio of the acrylate to acrylamide ranges from about 2:1 to 6:1, with 3:1 to 5:1 being preferred and 3:1 to 4:1 most preferred. The weight average molecular weight of the copolymer ranges from 3,000 to 10,000, preferably 4,000 to 8,000, and most preferably 5,000 to 6,000 and the number average molecular weight ranges from 500 to 2000, preferably 750 to 1750, and most preferably 1,000 to 1,500. Alternatively, the monomers may be copolymerized by techniques well known in the art.

The copolymer is available as a solution in water at relatively high concentrations (e.g. 40 wt %). If the concentrate has a high pH adjusted to provide a substantially neutral pH (i.e. 5 to 9, preferably 6–8). Substantially neutral pH solutions avoid precipitation of the copolymer at the high temperatures encountered in the injection tubing. Any mineral acid such as $HNO_3$ and HCl or organic acid such as acetic acid may be used for pH adjustment. HCl, however, is preferred because of its availablility.

For ease of handling, it may be necessary to further dilute the formulation with water to provide an aqueous solution of about 4 to 20% actives. This can be done at the well site. The water used in the formulation and dilution preferably is fresh water.

The formulation may include other additives commonly used in geothermal wells such as corrosion inhibitors.

In operation, the aqueous formulation is introduced down the well and injected into the well water preferably at a level below the scale zone (i.e. flash zone). The concentration of the copolymer in the water should be sufficient to inhibit the deposition of the scale and will range from 0.5 ppm to 10 ppm. The optimum range being 1 to 5 ppm.

The inhibitor formulation, because of its high temperature stability, is effective in the treatment of high temperature geothermal wells (400° F.–700° F.), particularly in the 450° F. to 600° F. range.

The scale inhibitor formulation may be injected through a capillary tube (1/16" to 1") by techniques well known in the art.

EXPERIMENTS

Scale Inhibition Thermal Stability Tests

Test Procedures:

1. To test the heat stability, the scale inhibitor sample* tested were diluted to 12% activity. These diluted solutions were adjusted to pH's of approximately 4, 8, and 12.

*Na acrylate/acrylamide copolymer with weight ratio of about 4:1 and weight average molecular weight of 5000 to 6000.

2. Each solution was added to a numbered ignition tube and 3 tubes were placed in a Baroid Mud aging cell. A 50 ml beaker was placed over the 3 tubes. Twenty ml of de-ionized water was added to each aging cell (to equalize the vapor pressure).

3. The aging cell was pressurized to 500 psi with nitrogen.

4. The samples were exposed to 525° F. for a minimum of ½ hour. It was determined that 2 hours time was necessary for the temperature of the fluid in the cell to reach 525° F. and be at that temperature for ½ hour.

5. The ignition tubes were removed and the sample observed for precipitation and cloudiness.

The sample at pH 8 was observed to be clear after the test with no visual precipitation. The samples at pH's of 4 and 12 had precipitation therein. It should be noted that most commercial scale inhibitor formulations do not have thermal stability at the test temperature (525° F.).

Scale Inhibitor Effectiveness

The scale inhibitor formulation* pH adjusted to 8 was tested for effectiveness after various heat exposure times (½ hour, 1 hour, and 1 1/2 hours). The tests employed a modified National Association Engineers Test Method NACE Standard TM 03-74. This test method evaluates the performance of a scale inhibitor expressed as a percentage of inhibition.

If the scale inhibitor is effective in the unheated system, but not in the heated system, the value of B is high (approaches X) and the value A is low (since less $CaCO_3$ remains in solution). The test thus compares the effects of high temperature exposure of the scale inhibitor.

Table I presents the results of the NACE $CaCO_3$ tests at various exposure times (after two-hour warm up) and various concentrations of the copolymer actives in the formulation.

TABLE I

| SYSTEM CONDITIONS | HOURS EXPOSURE | PERCENT INHIBITION | | |
|---|---|---|---|---|
| | | 1.6 ppm | 3.5 ppm | 7.0 ppm |
| Before Heating | 0 | 30% | 77.5% | 95% |
| After Heating | ½ | 43.8% | 77.5% | 80% |
| % Reduction | | — | 0 | 15.8% |
| Before Heating | 0 | 50.2% | 88.6% | 100% |
| After Heating | 1 | 50.2% | 82% | 100% |
| % Reduction | | 0 | 7.4% | 0 |
| Before Heating | 0 | 22.5% | 64.8%[2] | 91.5% |
| After Heating | 1½ | 19.7% | 56.3%[2] | 87.3% |
| % Reduction | | 12.4% | 13.1%[2] | 4.6% |

[2] 2.6 ppm

The data in Table I demonstrates that the effectiveness of the scale inhibitor is not appreciably reduced at high temperatures. In many of the tests, the effectiveness of the scale inhibitor was actually improved after heating.

Corrosion Tests

Stainless steel (SS 316L) capillary tubing coupons, 2"×¼"O.D.×0.152" I.D., were cut from a standard roll of NL Sperry Sun capillary tubing. Additionally, Incoloy 825 specimens, the same size, were cut from available NL Sperry Sun tubing. The specimens were cleaned in xylene, rinsed in acetone, dried, and weighed to the nearest tenth of a milligram. The coupons were then placed in a stainless steel Autoclave Engineering Incorporated high temperature, high pressure cell.

The modified Na acrylate/acrylamide copolymer formulation*, 5.0 ml and 45 ml of deionized water were added to each test cell. The cells were pressurized with 2000 psi of nitrogen. The cells were then placed in a thermostatically controlled oven where the temperature was maintained at 555° F., (290° C.), for 90 hours. After the exposure time, the capillary tubing specimens were cleaned in 15% inhibited hydrochloric acid, rinsed in water, rinsed in acetone, dried, and weighed. The capillary tubing was visually inspected. The corrosion rate was calculated from the weight loss:

| Coupon | Corrosion Rate (mpg) |
|---|---|
| Stainless Steel | 0.214 |
| Incoloy | 0.300 |

*same formulation as used in above tests (ph 8 adjusted)

The corrosivity tests demonstrate that, unlike many commercial scale inhibitors, the scale inhibitor formulation used in the present invention does not appreciably increase corrosivity.

Field Test

A geothermal well 1100 meters deep tended to scale at in the 300 to 800 meter zone. The scale would build up in about two months causing drawdown of 40% or more and required clean out annually. (Drawdown is the percentage loss of production resulting from scale deposits in the well pipe.)

An aqueous formulation (same as the pH 8 samples used in the thermal and NACE $CaCO_3$ tests described above) was introduced into the well at a depth of 1000 meters using a capillary tube at 108 gallons per day providing a copolymer concentration in the well water at about 1.2 ppm.

During the treatment, the well experienced no significant reduction in drawdown indicating that no scale or negligible scale was deposited over a period of 6 months.

What is claimed is:

1. A method of treating a geothermal water well producing from a subterranean formation through pipe in the well, said method comprising introducing into said well pipe at a subsurface location an effective amount of a scale inhibitor formulation to inhibit the build up of $CaCO_3$ scale therein; said formulation comprising an aqueous solution of a Na acrylate/acrylamide copolymer having the following formula

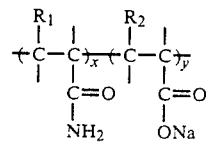

where
$x+y=1$;
x ranges from about 0.3 to about 0.15;
y ranges from about 0.7 to about 0.85;
$R_1$ is H, $C_1$ or $C_2$; and
$R_2$ is H, $C_1$ or $C_2$.

2. The method of claim 1 wherein the well temperature at the injection point is between 400° and 700° F.

3. The method of claim 1 wherein the concentration of the copolymer in the well water ranges from 0.5 to 10 ppm.

4. The method of claim 1 wherein the formulation has a pH of 5 to 9.

5. The method of claim 1 wherein x is 0.2 and y is 0.8.

6. The method of claim 1 wherein the weight average molecular weight of the copolymer ranges from 3,000 to 10,000.

7. The method of claim 6 wherein the scale inhibitor formulation is injected into the well below the flash zone of the water in the well.

8. The method of claim 1 wherein the copolymer has a thermal stability above 500° F. for at least ½ hour.

9. The method of claim 1 wherein the scale inhibitor formulation is introduced into the well pipe by extending a tube into the well from the surface to a depth below the flash point of the water in the well and flowing the formulation through the tube.

* * * * *